United States Patent
Wolfe

(10) Patent No.: US 6,730,873 B2
(45) Date of Patent: May 4, 2004

(54) OXY-CARBON ARC CUTTING ELECTRODE

(76) Inventor: Eric Wolfe, 8979 Lager Rd., Phelan, CA (US) 92371

( * ) Notice: Subject to any disclaimer, the term of this patent is extended or adjusted under 35 U.S.C. 154(b) by 0 days.

(21) Appl. No.: 10/188,550

(22) Filed: Jul. 5, 2002

(65) Prior Publication Data

US 2004/0004060 A1 Jan. 8, 2004

(51) Int. Cl.⁷ .............................................. B23K 26/00
(52) U.S. Cl. ........................................ 219/70; 219/69.1
(58) Field of Search ..................... 219/70, 69.1, 69.11

(56) References Cited

U.S. PATENT DOCUMENTS

| | | | | |
|---|---|---|---|---|
| 4,069,407 A | * | 1/1978 | Brower | 219/70 |
| 4,182,947 A | * | 1/1980 | Brower | 219/70 |
| 4,416,444 A | * | 11/1983 | Brower | 266/48 |
| 4,541,616 A | * | 9/1985 | Dean | 266/48 |
| 4,654,496 A | * | 3/1987 | DeMarsh et al. | 219/69.1 |
| 4,985,610 A | * | 1/1991 | Rucker et al. | 219/70 |

\* cited by examiner

*Primary Examiner*—M. Alexandra Elve
(74) *Attorney, Agent, or Firm*—Morland C. Fischer

(57) ABSTRACT

A consumable, oxy-carbon arc cutting electrode to be used in an oxygen exothermic torch for cutting both ferrous and non-ferrous metals. The cutting electrode includes a hollow, outer copper clad steel tube. A plurality of copper clad carbon fuel rods run through and are surrounded by the outer tube. The plurality of fuel rods are aligned in side-by-side engagement with one another and positioned circumferentially around the interior of the outer tube so that a passageway extends longitudinally through the outer tube in coaxial alignment with the circumferential arrangement of fuel rods. Pure oxygen gas is blown from the torch down the passageway through the center of the outer tube and along the fuel rods. By virtue of the foregoing, the oxy-carbon arc cutting electrode of this invention is capable of sustaining a higher combustion temperature, having a longer life, and generating lower levels of noise relative to conventional exothermic and air-carbon-arc cutting rods.

8 Claims, 1 Drawing Sheet

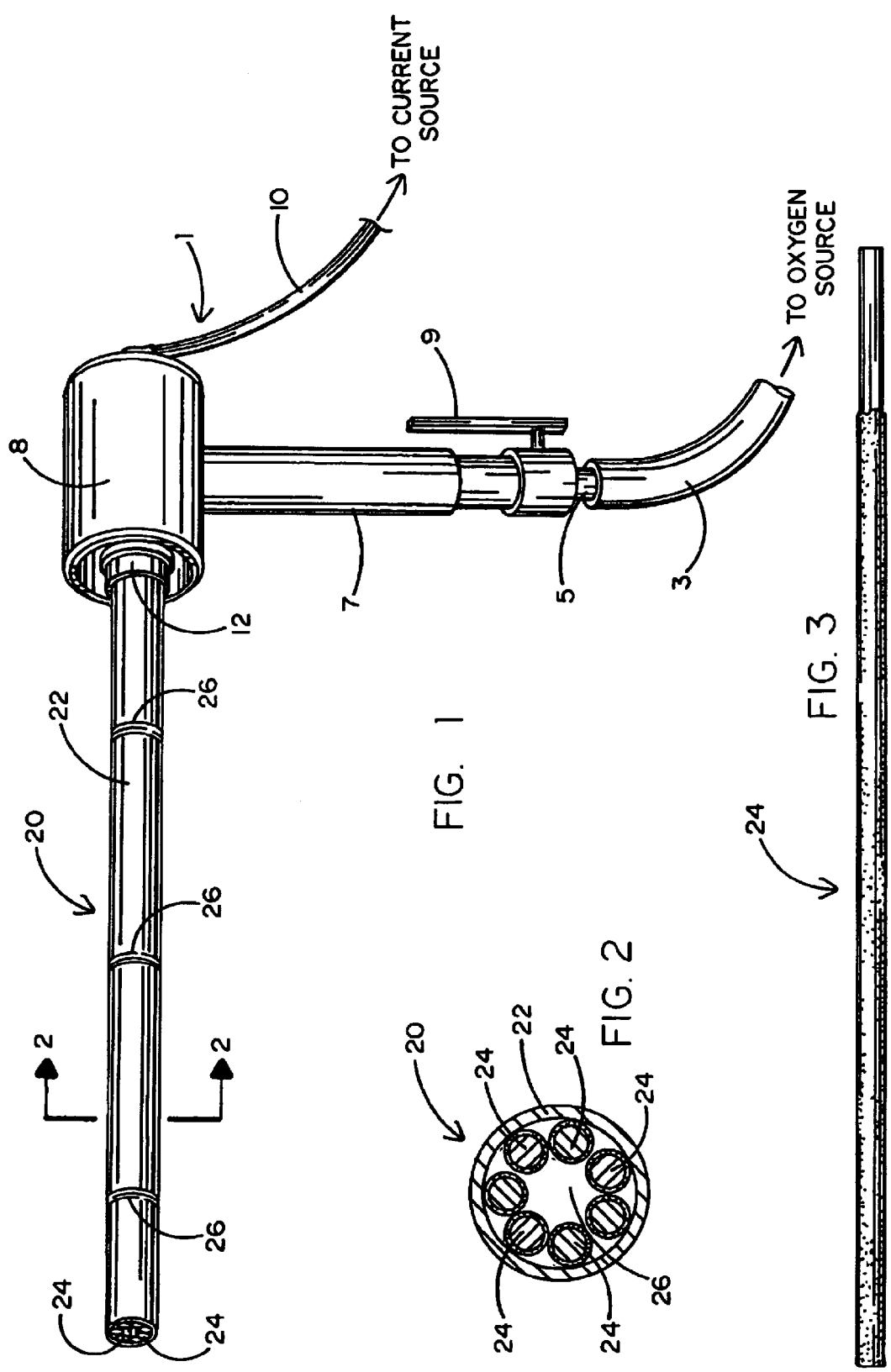

OXY-CARBON ARC CUTTING ELECTRODE

BACKGROUND OF THE INVENTION

1. Field of the Invention

This invention relates to a consumable oxy-carbon arc electrode for exothermic cutting applications that is characterized by a higher combustion temperature, a longer life, and lower noise generation relative to conventional cutting rods.

2. Background Art

It is known in the art to use an exothermic cutting rod with a suitable torch for generating a high temperature flame by which to cut metal. The conventional exothermic cutting rod typically includes an elongated (about 18 inches) outer steel tube having an inner fuel material. In this case, the fuel material is generally a set of steel wires. Substantially pure oxygen is blown at high pressure through the interior of the outer steel tube. The torch has an associated low voltage source (e.g. a 12 volt battery) to ignite a catalytic spark at the end of the cutting rod. The primary disadvantage of an exothermic cutting rod is that the outer tube and inner fuel material thereof are consumed at a very high rate (in usually less than 60 seconds). Thus, a worker will be interrupted by having to make frequent replacements of fully consumed cutting rods.

It is also known in the art to use an air-carbon-arc cutting rod in a torch to cut metal. The air-carbon-arc cutting rod typically includes an elongated solid carbon rod. Compressed air is blown at high pressure along the exterior of the solid carbon rod. In this case, the torch has an associated high current source (e.g. from 250 to 600 amps) to ignite a cutting flame. The primary disadvantage of an air-carbon-arc cutting rod is that as a consequence of running high pressure compressed air along the exterior thereof, very high levels of noise (as much as 119 decibels) are generated. Subjecting a worker to such high noise levels while on the job can lead to increased stress and/or hearing problems over time.

Accordingly, it would be desirable to have a cutting electrode which would have a longer life prior to consumption, could be used in exothermic applications for cutting both ferrous and non-ferrous metals at substantially reduced noise levels, and would produce a cutting flame of relatively high temperature when compared with the conventional exothermic and air-carbon-arc cutting rods that have been described above.

Examples of conventional cutting torches and/or consumable electrodes for use therein are available by referring to the following U.S. patents:

| | | |
|---|---|---|
| 4,069,407 | Jan. 17, 1978 | J. S. Brower |
| 4,423,301 | Dec. 27, 1983 | P. J. Rieppel et al |
| 4,541,616 | Sep. 17, 1985 | J. L. Dean |

SUMMARY OF THE INVENTION

In general terms, a consumable, oxy-carbon arc cutting electrode is disclosed that overcomes the problems inherent with the conventional exothermic and air-carbon-arc cutting rods. The oxy-carbon arc cutting electrode of this invention is adapted to be detachably connected to an oxygen exothermic torch that is coupled to a source of pure (e.g. 99%) oxygen gas under pressure. The cutting electrode includes a hollow, sacrificial cutting rod comprising an outer steel or carbon tube. A plurality of solid carbon fuel rods run through and are surrounded by the outer tube. The plurality of fuel rods are aligned with one another and positioned circumferentially around the interior of the outer tube. A central passageway extends longitudinally through the outer tube so as to lie in coaxial alignment with the circumferential arrangement of fuel rods. The central passageway establishes an air gap through which the pure oxygen gas is blown from the torch to which the cutting electrode is connected.

By blowing pure oxygen gas (rather than compressed air) down the central passageway of the cutting electrode and past the fuel rods thereof, the temperature of the cutting flame at the tip of the electrode can be increased. Moreover, any molten metal that accumulates within the central passageway during the cutting operation will be blown outwardly therefrom. The cutting operation can be completed under substantially reduced noise levels so as to alleviate worker discomfort. Finally, the life of the oxy-carbon arc cutting electrode of this invention will be substantially increased so as to avoid frequent and costly replacements.

BRIEF DESCRIPTION OF THE DRAWINGS

FIG. 1 shows the oxy-carbon arc cutting electrode of this invention detachably connected to an oxygen exothermic torch to which pure oxygen gas under pressure is supplied;

FIG. 2 is a cross section of the cutting electrode taken along lines 2—2 of FIG. 1; and FIG. 3 shows a single elongated fuel rod removed from the cutting electrode of FIG. 2.

DETAILED DESCRIPTION

Referring initially to FIG. 1 of the drawings, an oxygen exothermic torch 1 is shown which is used in combination with the oxy-carbon arc electrode 20 that forms this invention for cutting both ferrous and non-ferrous metals. However, it is to be understood that use of the cutting electrode 20 is not limited to the particular torch illustrated in FIG. 1. The oxygen exothermic touch 1 of FIG. 1 includes an oxygen hose 3 which is coupled at one end thereof to a source of pure (e.g. 99%) oxygen gas (not shown). The opposite end of the hose 3 is coupled to a fitting 5 that lies in fluid combination with a hollow handle 7 of torch 1. The hollow handle 7 lies in fluid communication with a barrel 8 of the torch 1. Thus, combustible oxygen gas is supplied under pressure from the source thereof to barrel 8 by way of an oxygen supply line that includes the hose 3 and the hollow handle 7. A suitable flow control lever 9 is manually operated to regulate the flow of the oxygen gas through the oxygen supply line.

An electrical cable 10 runs from an electrical contact at the rear of the barrel 8 to a relatively medium (when compared with the current source typically associated with an air-carbon-arc cutting rod) current source (not shown). In a typical embodiment, the current source to which cable 10 is connected is a 225 to 250 amp DC source. To complete a circuit for igniting a cutting arc when the electrode 20 is moved into contact with the metal to be cut by torch 1, a first (e.g. the negative) terminal of the DC current source is electrically connected to the contact at the barrel 8 of torch 1, and the opposite (e.g. the positive) terminal of the current source is electrically connected to the metal.

The oxy-carbon arc cutting electrode 20 of this invention comprises a hollow sacrificial cutting rod that preferably includes an outer copper clad steel or carbon tube 22 which is consumed during use. That is to say, the cutting electrode 20 will burn down to about three inches in length before it is fully consumed and must then be replaced in torch 1. In this regard, the outer tube 22 of electrode 20 has an initial length of about 18 inches and a diameter of between 0.375 to 0.5 inches. One end of the cutting electrode 20 is detachably connected to the electrical contact at the barrel 8 of torch 1 by a pressure fit that is created by means of a collet 12, or the like.

As will be described next while referring to FIGS. 2 and 3, the cutting electrode 20 of torch 1 has a plurality of (e.g. seven) elongated fuel rods 24 running axially through and surrounded by the outer tube 22. A series of uniformly spaced crimps 26 are made in the outer tube 22 so as to apply a suitable holding pressure to prevent a displacement of the fuel rods 24 within the outer tube 22 of cutting electrode 20.

Turning now to FIGS. 2 and 3 of the drawings, the plurality of elongated fuel rods 24 of the oxy-carbon arc cutting electrode 20 are shown axially aligned in side-by-side engagement with one another and positioned so as to extend circumferentially around the interior of outer tube 22. However, the fuel rods 24 may be arranged with one another in either a radial or bundle fashion. As an important detail of the cutting electrode 20 of this invention, a central passageway 26 extends longitudinally through the outer tube 22 so as to lie in coaxial alignment with the circumferential arrangement of fuel rods 24. The passageway 26 establishes an air gap down the center of outer tube 22 through which the pure oxygen gas is blown under pressure via the aforementioned oxygen supply line through the hose 3, handle 7 and barrel 8 of the oxygen exothermic torch 1.

By blowing pure oxygen gas down the passageway 26 and through the center of the outer tube 22 of cutting electrode 20, the combustion temperature of the cutting flame at the tip of electrode 20 can be maximized. Moreover, any molten metal that accumulates within the passageway 26 during the cutting operation will be blown outwardly therefrom so as to prevent an unintended interruption or slowing of the cutting process.

Each of the elongated fuel rods 24 of the consumable oxy-carbon arc cutting electrode 20 shown in FIGS. 2 and 3 is preferably a copper clad carbon (i.e. graphite) rod. Prior to burning, each fuel rod 24 has an original length of about 12 inches and a diameter of between 0.125 to 0.25 inches. The copper clad carbon fuel rods 24 of cutting electrode 20 will have a higher electrical conductivity and be less brittle than the fuel rods used in some conventional cutting torches.

What is more, and by virtue of the consumable oxy-carbon arc cutting electrode 20 of this invention having axially extending fuel rods 24 with the central passageway 26 running longitudinally therebetween, pure oxygen, rather than compressed air, is blown through the center of outer tube 22 and over the fuel rods. Not only will a high temperature oxy-carbon cutting arc be established a the tip of electrode 20, but it has been found that the level of noise generated during the cutting procedure can be substantially reduced to approximately 60 decibels. In addition, the life of the oxy-carbon cutting electrode will be significantly increased so as to last for as long as 20 minutes prior to full consumption and the need for replacement. It may be appreciated that in view of the foregoing, a consumable cutting electrode 20 will be available for use in exothermic cutting applications having a longer life, producing a higher combustion temperature, and generating less audible noise relative to conventional cutting electrodes, particularly the well known exothermic and air-carbon-arc cutting rods. Accordingly, the cutting electrode 20 herein disclosed has particular application for cutting scrap as well as in dismantling, salvage, maintenance and repair settings, especially those found in a mine where high sound thresholds must be avoided to comply with government regulations.

I claim:

1. A combination for an exothermic cutting torch and a consumable cutting electrode having a first end thereof to be connected to said cutting torch and an opposite end to be moved into contact with a metal for generating a cutting arc by which the metal is cut, said cutting electrode comprising a hollow outer tube, a plurality of fuel rods extending through and surrounded by said outer tube, wherein each of said plurality of fuel rods is a copper clad carbon rod, said fuel rods positioned at the interior of said hollow outer tube to establish a passageway running longitudinally through the center of said outer tube, and an oxygen gas supply path formed in said cutting torch and lying in fluid communication with said cutting electrode, whereby oxygen gas is supplied down the passageway through the center of said outer tube and along the plurality of fuel rods surrounded thereby.

2. The combination recited in claim 1, wherein the oxygen gas supply path of said exothermic cutting torch is coupled to a source of substantially pure oxygen gas.

3. The combination recited in claim 1, wherein the passageway running longitudinally through the center of the hollow outer tube of said cutting electrode lies in coaxial alignment with said plurality of fuel rods surrounded by said outer tube.

4. The combination recited in claim 1, wherein the hollow outer tube of said cutting electrode is a copper clad steel tube.

5. The combination recited in claim 1, wherein said exothermic cutting torch is an oxygen exothermic torch, and the cutting arc generated by said cutting electrode is an oxy-carbon cutting arc.

6. The combination recited in claim 1, wherein said plurality of fuel rods surrounded by the hollow outer tube of said cutting electrode are aligned in side-by-side engagement with another to extend circumferentially around the interior of said outer tube.

7. The combination recited in claim 1, also comprising a series of crimps made in the hollow outer tube of said cutting electrode for applying a holding pressure to prevent a displacement of said plurality of fuel rods surrounded by said outer tube.

8. For use in an exothermic cutting torch, a consumable cutting electrode for generating a cutting arc and comprising a hollow-outer tube, a plurality of fuel rods extending through and surrounded by said outer tube, each of said plurality of fuel rods having a carbon fuel surrounded by an electrically conductive cladding and each of said plurality of fuel rods being positioned within said hollow outer tube to establish a longitudinal passageway through said outer tube so that a supply of combustible gas can be supplied down the longitudinal passageway and along said plurality of fuel rods surrounded by said outer tube.

* * * * *